Patented June 6, 1939

2,161,035

UNITED STATES PATENT OFFICE 2,161,035

METHOD OF MAKING PHOSPHATE-SULPHUR FERTILIZER

Howard W. Gilbert, Washington, D. C., assignor to Freeport Sulphur Company, New York, N. Y., a a corporation of Delaware No Drawing. Application July 27, 1937,
Serial No. 155,915

7 Claims. (Cl. 71—37)

The present invention relates to a method of making fertilizers, more particularly fertilizer compositions including as the major ingredients phosphate material and sulphur such, as for example, those described in the U. S. patent of John T. Claiborne, Jr., and Paul D. Petersen, No. 2,097,446, issued November 2, 1937.

A general object of the invention is the provision of an efficient, simple, unusually cheap and readily practiced method of making particulated fertilizer, each particle of which includes particles of phosphate fertilizer material bound together by sulphur, which is efficiently resistant to fracture and will remain in soil for an unusually long period of time while allowing acid formed by gradual oxidation of the sulphur to act freely with the phosphate without interference with soil bases, the method being particularly characterized by improvement of the bonding action of the sulphur.

More specific objects are the provision of such a method characterized by improvement of the bonding action of the sulphur by adjustment of the pH, and the obtainment of an unusually high yield of fertilizer pellets from such an acidulated phosphate-sulphur mixture upon pelletization while the sulphur is in a molten state.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In accordance with the present invention a phosphate fertilizer material in particulated form is mixed with molten sulphur and fertilizer particles comprising particles of phosphate material bound together by sulphur are formed from the sulphur. The mixture is acidulated by adding an acidic substance to the sulphur prior to mixing with the phosphate material, or by adding such substance to the phosphate-sulphur mixture, or by acidulating the sulphur in any other suitable manner. Preferably previously acidulated molten sulphur is poured or sprayed into a mass of particles of phosphate fertilizer material which, if desired, may be preheated. The mixture is then stirred in any suitable mixer of proper design and is subdivided into particles, preferably by pelletizing, while the sulphur is in the molten state but, if desired, by comminuting.

The tricalcium phosphate material may be any suitable phosphate fertilizer material which will meet the requirements of the soil to be amended and will not be deleteriously affected by the method of preparation of the fertilizer. Many tricalcium phosphate materials are suitable, for example, natural phosphates including phosphate rock; and the so-called artificial phosphates which are the products or by-products of various industrial processes, such as bone meal, and the like. The phosphate material which is suitable for use in accordance with the present invention is not necessarily of the type which will not be altered to any appreciable extent by temperatures encountered in the procedure, such as up to about 260° C., but must be of a nature such that even though subject to alteration by such temperatures it will be suitable as an ingredient of a fertilizer composition and a source for plant demands, such as phosphoric acid, when the fertilizer is applied to the soil. The preferred tricalcium phosphate material is readily available in the form of phosphate rock.

The amount of sulphur preferably constitutes between about 20% and 30% of the mixture so that porous pellets are obtained each of which includes particles of phosphate material bound together by sulphur in proportions whereby the ingredients are in their most available forms and most satisfactory with respect to the requirements made by the soil. Although this is the preferred range of the amount of sulphur, with the use of improved mixing equipment it may be possible, in the present invention, to lower the amount of sulphur, for example, to amounts as low as 10% to 15%. Amounts of sulphur greater than 20% to 30% may also be used in the production of particulated phosphate-sulphur fertilizer when the porosity is of less importance than other features and when heavy coatings of sulphur on the particles of phosphate material do not retard to an undesirable degree the reactions which are to take place in the soil. Such a composition having a high percentage of sulphur, e. g. 50% or more, would be used as a soil amendment in the treatment of alkaline soils, the excess sulphur being oxidizable into sulphuric acid for making the soil less alkaline and thus more suitable for plant growth while permitting within a reasonable time after application access to the particles of phosphate material for the production of phosphoric acid, etc.

A particular feature of the invention consists of adjusting the pH of the fertilizer mixture prior to the formation of the fertilizer particles. This may be done in a number of ways, for example, the sulphur prior to addition to the particles of phosphate material may be suitably acidulated or the sulphur after it has been added to the phosphate material may be acidulated. It has been found that by proper acidulation the wetting of the phosphate particles by the sulphur in a molten state is facilitated. This is particularly important when the fertilizer composition is to be pelletized in a manner similar to that described in the above identified Claiborne, Jr., et al. patent so that a high yield of formed pellets may be obtained without necessitating many repetitions of the procedure.

Adjustment of the pH may be obtained by firing the sulphur in a molten state prior to or during the addition of the phosphate material thereto. This may be done by permitting the sulphur to catch fire while it is being heated in a molten state. Firing results in the production of acids such as sulphuric and sulphurous thereby acidulating the molten sulphur with sulphuric and sulphurous acids. Alternatively the sulphur prior to, during or after the addition of phosphate material thereto may be acidulated by the addition of a suitable acidic substance, particularly those which will result in desirable ingredients in the finished fertilizer. Examples of suitable acidic substances are sulphuric acid, phosphoric acid, nitric acid, and acid salts thereof, which are relatively stable at temperatures encountered in the process. Examples of such salts are ammonium sulphate and ammonium phosphate.

Since in the preferred procedure the pH is to be adjusted by addition of an acidic substance to the sulphur while in the molten state, an acidic substance should be selected which is at least slightly soluble in sulphur and is relatively stable at the temperatures to be encountered in the preparation of the fertilizer. It has been found that sulphur will dissolve from about 0.2% to 0.4% sulphuric acid, which corresponds to about one drop of sulphuric acid per 25 grams of sulphur. In the case of acid salts, such, for example, as ammonium sulphate, larger amounts should be used as about from 1% to 10%. However, there is no particular disadvantage in using more of the acidic substance than that which will dissolve in the sulphur since larger amounts will readily mix in with the fertilizer composition. For example, it may be desired to prepare fertilizer compositions containing an appreciable amount of ammonium sulphate. This may be obtained by adding a greater quantity of ammonium sulphate than that which will dissolve in the sulphur, the excess amount being melted during the bonding by heat and apparently augmenting the bonding action of the sulphur.

Particulated phosphate material may comprise particles of any desired size but obviously they should be somewhat smaller than the particles of fertilizer are to be in the finished state. Since it is desired to produce the fertilizer composition in the form of particles which will pass through a screen of 8 to 16 mesh, the particles of phosphate material, such as phosphate rock, should be of a size that will pass through a screen of 20 mesh or more, preferably about 100 mesh, for obtaining a greater contact surface between the phosphate particles and the sulphur, although the invention may be efficiently practiced with finer particles of phosphate material, such as those which will pass through a screen of greater mesh, for example, about 200. It has been found in pelletizing the mixture that the percentage yield bears a definite relation to mesh size of phosphate material, the type of phosphate material used, and the percentage of sulphur used. For example, with the use of a particular type of phosphate rock it has been found that with lower percentages of sulphur, such as around 20%, a larger mesh size of phosphate rock gave a higher yield of large size pellets of fertilizer composition and that when a greater amount of sulphur was used, such as about 30%, a higher yield of large pellets was obtained with the finer mesh size of phosphate rock particles. The finer phosphate rock particles require a larger percentage of sulphur than do the larger particles. Good results have been obtained by using about 27.5% sulphur for phosphate rock particles between about 100 and 200 mesh and about 25% sulphur for between about 80 to 100 mesh.

The subdividing of the fertilizer composition into particles may be done in any suitable manner, such as by solidifying the molten mixture and then comminuting and breaking it up into particles, but is preferably accomplished by pelletizing the mixture, i. e., by passing it while the sulphur is in a molten state through apertures of suitable apparatus, such as an extruding device, or a screen of relatively large mesh, e. g. about 8 to 16 mesh. It has been found that if the mixture, while the sulphur is in a molten state, is passed through such apertures at the temperature of the dark viscous stage of the sulphur, e. g. between about 160° and 260° C., preferably at a temperature between about 180° and 220° C., the mixture will as it emerges from the apertures break up into pellets. It is preferable to use temperatures in the neighborhood of 200° C. since the mixture loses considerable heat when pressed through the pelletizing screen. However, when working with a continuous feed with heat being supplied while the pellets are being molded, it may be possible to use lower temperatures. It appears that the mixture should be at a temperature of at least about 180° C. to give the best bond of the particles of phosphate material by the sulphur. When using about 27.5% sulphur with phosphate rock particles of a mesh of between about 100 and 200, and 25% sulphur with phosphate rock particles of about 80 to 100 mesh, and pelletizing with a screen of about 16 mesh, it has been found that a yield of about 40% of pellets of a size of about 16 to 20 mesh are obtained in a single pass of the mixture through the screen, although single passes in many cases have been found to give much greater percentage yields, for example, as high as about 60 to 70%.

Any suitable procedure for forming the mixture of phosphate material and molten sulphur may be practiced in accordance with the present invention. Elemental sulphur in any of its several forms may be mixed with phosphate rock particles and eventually brought to the molten state by the application of heat or pressure or both. Sulphur at the point of production as it flows in the molten state from the mine, or from a retort, may have added thereto the acidic substance and then mixed with the particles of phosphate material or may be mixed with the acidic substance and particles of phosphate material, thereby conserving heat which is normally wasted. Also if acidulation is to be attained by firing the sulphur, the molten sulphur as it flows from the mine may be additionally heated to firing and then mixed with the particles of phosphate material. Thus the fertilizer composition may be made in sulphur mining localities at unusually low manufacturing cost. Obviously, after forming the mixture, it may be allowed to cool and then be reheated and pelletized at the temperature of the dark viscous stage of the sulphur, but preferably pelletizing is done immediately after the molten sulphur is added to the phosphate material, with suitable temperature control so that heat may be conserved. The mass of particles of phosphate material or phosphate rock particles may be preheated or not, as desired. If heated at a relatively high temperature, say 1,000° C., or higher, before the molten sulphur is added thereto some of the phosphate will be released to be present in the fertilizer mixture in a form immediately available to plants.

By way of example, the following procedures have been carried out in accordance with the features of the present invention:

I. 25 grams of sulphur were heated to between about 190° and 200° C., care being taken to prevent the sulphur from catching fire, and were poured on 75 grams of particles of phosphate rock which passed through 100 mesh screen and the mixture was thoroughly stirred and pressed through a 16 mesh screen to form pellets, the resulting pellets being permitted to drop about 6 inches in air after passing through the screen to insure sufficient solidification. The product was then sieved on a 60 mesh screen and yielded 20.8% pellets of between about 16 and 60 mesh and 79.2% pellets smaller than 60 mesh in size.

II. 25 grams of sulphur were heated to between 190° and 200° C., permitted to catch fire, and were then poured on 75 grams of particles of phosphate rock which passed through a 100 mesh screen and the mixture was thoroughly stirred and pressed through a 16 mesh screen to form pellets, the resulting pellets being permitted to drop about 6 inches in air after passing through the screen. The product was then sieved and yielded 34.5% pellets of between about 16 and 60 mesh and 65.5% pellets less than 60 mesh. The whole mass of pellets was then reheated to between about 200° and 250° C., and stirred, pelletized and screened as before, a yield of about 35% pellets between about 16 and 60 mesh and 65% pellets smaller than 60 mesh was obtained.

III. 25 grams of sulphur were heated to 150° C., one drop of sulphuric acid was added and the molten sulphur rapidly stirred until the acid was dissolved. The sulphur was then allowed to cool and harden and then was ground into a fine powder. This powder was then mixed with 75 grams of phosphate rock particles which passed through a 100 mesh screen and the mixture was heated to about 200° C., being simultaneously stirred to insure uniform distribution of the ingredients. The mixture was then forced through a 16 mesh screen, allowing the pellets to drop about 6 inches in air after passing through the screen, and the pellets then sieved on a 60 mesh screen. About 46.5% pellets between about 16 and 60 mesh were obtained and about 53.5% pellets smaller than 60 mesh resulted. The mass of smaller pellets was reheated and repelletized in the above manner and practically all of the reworked material resulted in pellets between about 16 and 60 mesh.

IV. 15 grams of sulphur were mixed with 40 grams of phosphate rock particles which passed through 100 mesh screen and 6.5 grams of finely divided ammonium sulphate were added. The percentages of ingredients were about 65% phosphate rock, 24.4% sulphur, 10.6% ammonium sulphate, with the phosphate-sulphur portion of the mixture comprising about 72.7% phosphate rock and about 26.3% sulphur. The mixture was heated to between about 180° and 200° C. and the molten mixture pelletized by forcing it through a 16 mesh screen. No evolution of ammonia during heating was noted and the addition of ammonium sulphate apparently introduced no difficulties.

It is thus apparent, particularly from the examples set forth above, that adjustment of the pH by the addition of acidic substance or by firing the sulphur improves the bonding action of the sulphur and that the present invention efficiently attains the objects set forth above. Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention, what I claim as new and desire to secure by Letters Patent, is:

1. The method of making a phosphate-sulphur fertilizer comprising acidulating sulphur with approximately an amount of sulphuric acid which will dissolve therein, mixing the acidulated sulphur in a molten state with tricalcium phosphate material, and subdividing into particles the resultant mixture of particles of tricalcium phosphate bonded together by acidulated sulphur.

2. The method of making a phosphate-sulphur fertilizer comprising acidulating sulphur with approximately an amount of sulphuric acid which will dissolve therein, bonding together particles of tricalcium phospate material with the acidulated sulphur in the molten state to form a mixture, and pelletizing the resultant mixture at the temperature of the dark viscous stage of molten sulphur.

3. The method of making a phosphate-sulphur fertilizer comprising acidulating sulphur with from about 0.2% to 0.4% sulphuric acid, bonding together particles of tricalcium phosphate material with the acidulated sulphur in the molten state to form a mixture, and pelletizing the resultant mixture at the temperature of the dark viscous stage of molten sulphur.

4. The method of making a phosphate-sulphur fertilizer comprising acidulating sulphur with about 0.2% to 0.4% sulphuric acid, mixing the acidulated sulphur with phosphate rock particles in the proportion of about from 1:4 to 3:7, and pelletizing the mixture at the temperature of the dark viscous stage of molten sulphur.

5. The method of making a phosphate-sulphur fertilizer comprising acidulating sulphur with sulphuric acid by adding to the sulphur when at about 150° C. about four drops per 100 grams of sulphur, mixing the acidulated sulphur with phosphate rock particles in the proportion of about from 1:4 to 3:7, and passing the mixture at a temperature between about 160° C. and 260° C. through apertures to form pellets.

6. The method of making a phosphate-sulphur fertilizer comprising acidulating sulphur with sulphuric acid by adding to the sulphur when at about 150° C. about four drops per 100 grams of sulphur, mixing the acidulated sulphur with phosphate rock particles which will pass through a twenty mesh screen in the proportion of about from 1:4 to 3:7, and passing the mixture at a temperature between about 180° C. and 220° C. through a screen of between about eight and sixteen mesh to form pellets.

7. The method of making a phosphate-sulphur fertilizer comprising acidulating sulphur with approximately an amount of acidic substance which will dissolve therein, said acidic substance being selected from the group consisting of sulphuric acid, phosphoric acid, nitric acid, and acid salts thereof which are relatively stable at temperatures encountered in the process and are soluble to a degree in molten sulphur, bonding together particles of tricalcium phosphate material with the acidulated sulphur in the molten state to form a mixture, and pelletizing the resultant mixture at the temperature of the dark viscous stage of molten sulphur.

HOWARD W. GILBERT.

---

CERTIFICATE OF CORRECTION.

Patent No. 2,161,035. June 6, 1939.

HOWARD W. GILBERT.

It is hereby certified that error appears in the printed specification of the above numbered patent requiring correction as follows: Page 1, first column, line 41, for the words "sulphur. The mixture" read mixture. The sulphur; line 54, strike out "tricalcium" and insert the same after "suitable" in line 55; and that the said Letters Patent should be read with this correction therein that the same may conform to the record of the case in the Patent Office.

Signed and sealed this 8th day of August, A. D. 1939.

Leslie Frazer,
(Seal) Acting Commissioner of Patents.

at a temperature between about 160° C. and 260° C. through apertures to form pellets.

6. The method of making a phosphate-sulphur fertilizer comprising acidulating sulphur with sulphuric acid by adding to the sulphur when at about 150° C. about four drops per 100 grams of sulphur, mixing the acidulated sulphur with phosphate rock particles which will pass through a twenty mesh screen in the proportion of about from 1:4 to 3:7, and passing the mixture at a temperature between about 180° C. and 220° C. through a screen of between about eight and sixteen mesh to form pellets.

7. The method of making a phosphate-sulphur fertilizer comprising acidulating sulphur with approximately an amount of acidic substance which will dissolve therein, said acidic substance being selected from the group consisting of sulphuric acid, phosphoric acid, nitric acid, and acid salts thereof which are relatively stable at temperatures encountered in the process and are soluble to a degree in molten sulphur, bonding together particles of tricalcium phosphate material with the acidulated sulphur in the molten state to form a mixture, and pelletizing the resultant mixture at the temperature of the dark viscous stage of molten sulphur.

HOWARD W. GILBERT.

CERTIFICATE OF CORRECTION.

Patent No. 2,161,035. June 6, 1939.

HOWARD W. GILBERT.

It is hereby certified that error appears in the printed specification of the above numbered patent requiring correction as follows: Page 1, first column, line 41, for the words "sulphur. The mixture" read mixture. The sulphur; line 54, strike out "tricalcium" and insert the same after "suitable" in line 55; and that the said Letters Patent should be read with this correction therein that the same may conform to the record of the case in the Patent Office.

Signed and sealed this 8th day of August, A. D. 1939.

(Seal) Leslie Frazer,
Acting Commissioner of Patents.